United States Patent [19]

Paurat et al.

[11] Patent Number: 4,557,373
[45] Date of Patent: Dec. 10, 1985

[54] SYSTEM FOR CONVEYING BULK MATERIAL AND PEOPLE IN A MINE

[76] Inventors: Friedrich W. Paurat, Kasselweg 29, 4230 Wesel 1; Boland Paurat, Blumenstrasse 11, 4230 Wesel 13, both of Fed. Rep. of Germany

[21] Appl. No.: 586,866

[22] Filed: Mar. 9, 1984

[30] Foreign Application Priority Data

Mar. 12, 1983 [DE] Fed. Rep. of Germany ....... 3308918

[51] Int. Cl.$^4$ ............................................. B65G 15/08
[52] U.S. Cl. .................................... 198/819; 198/321; 198/678; 104/89
[58] Field of Search ............... 198/321, 477, 570, 678, 198/819; 104/89, 173 ST, 93

[56] References Cited

U.S. PATENT DOCUMENTS 4,265,353  5/1981  Hill ..................................... 198/321

FOREIGN PATENT DOCUMENTS 3202719  5/1983  Fed. Rep. of Germany .
0248370  2/1948  Switzerland ........................... 104/89

Primary Examiner—Joseph E. Valenza
Assistant Examiner—Lyle Kim
Attorney, Agent, or Firm—Karl F. Ross; Herbert Dubno

[57] ABSTRACT

A conveyor system has a track defining an endless path traversing a loading station and an unloading station and having a transport stretch therebetween, an annular succession of longitudinally spaced trucks riding on the track, and an endless conveyor belt extending along the track and having a pair of longitudinally extending edges one of which is suspended from every other truck and the other of which is suspended from the remaining trucks. A drive element extends along the track and engages the trucks to advance the belt in a longitudinal transport direction from the loading station through the transport stretch to the unloading station and then back to the loading station. At least one carrier is connected to the lower end of at least one hanger having an upper end releasably attachable to the belt so as to suspend the carrier from the belt in the transport stretch. The carrier can be a flat rigid pallet having corners each connected to the lower end of a respective such hanger. It can also be an upwardly open material-carrying vessel similarly having corners each connected to the lower end of a respective such hanger or a simple skilift-type chair suspended from a rigid hanger, a system which makes it very convenient for individuals to move along the often very long transport stretch in a mine.

16 Claims, 7 Drawing Figures

019# SYSTEM FOR CONVEYING BULK MATERIAL AND PEOPLE IN A MINE

FIELD OF THE INVENTION

The present invention relates to a belt-type conveyor. More particularly this invention concerns such a conveyor which is used in a mine for the transport of bulk material such as ore.

BACKGROUND OF THE INVENTION

A belt-type conveyor is known from commonly owned U.S. patent applications Nos. 385,065, 388,592, and 461,534 respectively filed June 4, 1982, June 15, 1982, and Jan. 27, 1983 which is used for transporting bulk material mainly underground along a closed path traversing at least one loading or unloading zone. Such a conveyor system has a track on the path and including a main rail following the path outside the zone and having ends at the zone, respective intersections at the zone connected between the rail ends and respective right and left rail branches extending between the intersections. An endless conveyor belt extends along the path and through the zone and has right and left longitudinal edges provided with respective endless rows of longitudinally spaced right and left trucks alternating with one another along the path and each having a lower end attached to the respective belt edge and an upper end riding on and displaceable longitudinally in the rail. An endless and flexible tension-transmitting drive element extends along the path and through the zone and is connected at least indirectly to the belt and trucks. A drive is connected to the drive element for advancing the belt and trucks along the path in a transport direction. Relative to the transport direction, at the upstream intersection the right trucks pass into the right branch and the left trucks into the left branch. The belt is closed and tubular outside the zone when its right and left trucks are all in the main rail and is open in the zone when the right trucks are in the right branch and the left trucks are spaced therefrom in the left branch.

Such a conveyor can move bulk material in a mine relatively neatly, normally along underneath the mine roof. The bulk material is well contained as it is transported in the belt when its edges are pulled together to make the belt tubular and can be loaded into the belt and unloaded from it relatively easily when the belt edges are pulled apart, making the belt flat.

This type of system, nonetheless, is invariably wholly independent of any type of conveyor or transporter for other then bulk material. Thus people, tools, and equipment must be moved about by a wholly different transport system, typically by means of automotive tractors. These tractors are expensive both as regards first costs and operation expenses, and therefore are not provided in sufficient quantities to make then convenient.

OBJECTS OF THE INVENTION

It is therefore an object of the present invention to provide an improved conveyor system for underground use.

Another object is the provision of such a conveyor system for underground use which overcomes the above-given disadvantages, that is which can also be used to transport people and/or objects at least along the transport stretch between the location where the bulk material is loaded onto the belt and the location where it is unloaded therefrom.

SUMMARY OF THE INVENTION

A conveyor system according to the invention has a track defining an endless path traversing a loading station and an unloading station and having a transport stretch therebetween, an annular succession of longitudinally spaced trucks riding on the track, and an endless conveyor belt extending along the track and having a pair of longitudinally extending edges one of which is suspended from every other truck and the other of which is suspended from the remaining trucks. A drive element extends along the track and engages the trucks to advance the belt in a longitudinal transport direction from the loading station through the transport stretch to the unloading station and then back to the loading station. At least one carrier is connected to the lower end of at least one hanger having an upper end releasably attachable to the belt so as to suspend the carrier from the belt in the transport stretch.

It therefore is possible for the system of this invention to be used in transporting tools and people as well as bulk material. As the load-carrying capacity for such a conveyor system is very great, hanging a carrier on it will not overload it, as the additional load of at most a few hundred kilograms is minor compared to the weight of the bulk material the conveyor normally contains and moves. Typically such belt conveyors are run just underneath the mine roof in any case, so there is ample room beneath them for the carriers to move. Since the carrier is supported from the belt, not from the drive element, connection is simple and convenient.

According to this invention the carrier is a flat rigid pallet having corners each connected to the lower end of a respective such hanger. It can also be an upwardly open material-carrying vessel similarly having corners each connected to the lower end of a respective such hanger. It can also be a simple skilift-type chair suspended from a rigid hanger, a system which makes it very convenient for individuals to move along the often very long transport stretch in a mine. Such a chair can be provided with a a hook engageable over the belt edges between adjacent trucks so that the would-be rider need merely hook it over the belt and sit in it, a maneuver no more difficult than mounting a standard T-bar lift, especially considering the relatively slow travel speed of the standard mine belt conveyor. For transporting a number of passengers the carrier is an upwardly open person-carrying gondola having corners each connected to the lower end of a respective such hanger.

The belt according to this invention is provided along each of its edges with a row of pockets open toward the edges and the attaching means is constituted as hooks engageable in the pockets. The hanger can include a stiff rod portion pivoted at the lower end on the carrier or it can be a cable or chain that is flexible and substantially inelastic.

In another system according to this invention the belt is provided between its edges with a flexible and inextensible elements forming a succession of laterally open apertures and the attaching means is a hook engageable through the apertures.

The system of this invention is normally provided with a boarding station adjacent the loading station and adapted for attaching the carriers to the belt and a disembarking station adjacent the unloading station and adapted for disattaching the carriers from the belt.

According to another feature of this invention closing means is provided at the loading station for moving the edges from a spaced-apart position with the belt lying open therebetween to a juxtaposed position with the belt tubular. Thus the belt is tubular as it enters the transport stretch. Opening means is similarly provided at the unloading station for moving the edges from the juxtaposed position to the spaced-apart position. Thus the belt is flattened out at the output stretch so that bulk material loaded onto the flattened out belt at the loading station is transported by the belt through the transport stretch and discharged from the belt at the unloading station. The track branches into two branch tracks at the loading and unloading stations. In addition a deflector is provided upstream of the loading zone on the track for deflecting alternating trucks into the loading-zone branch tracks.

DESCRIPTION OF THE DRAWING

The above and other features and advantages will become more readily apparent from the following, reference being made to the accompanying drawing in which:

FIGS. 1a and 1b are large-scale views of a detail of FIG. 1;

SPECIFIC DESCRIPTION

Figure 1:
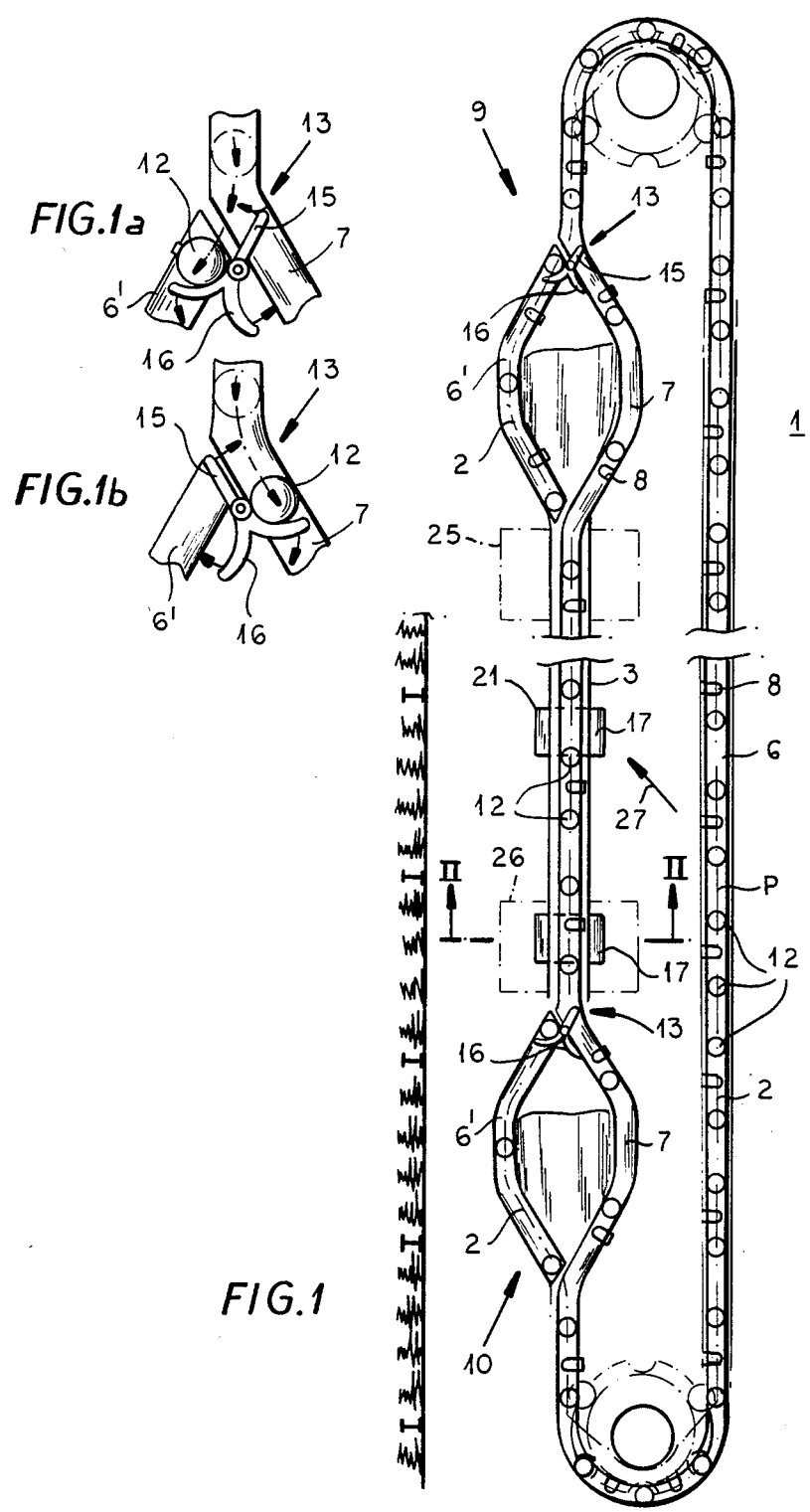
FIG. 1 is a top view of the conveyor according to this invention.
Figure 2:
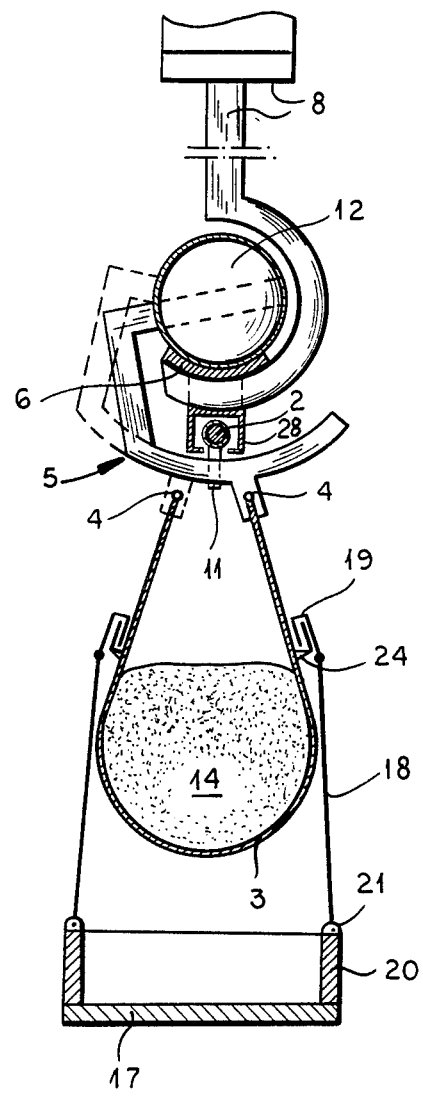
FIG. 2 is a large-scale cross section taken along line II—II of FIG. 1.

As seen in FIGS. 1 and 2 the conveyor according to this invention extends in a mine 1 and has an endless flexible drive element 2, here a steel cable, that moves along an annular path indicated at dot-dash line P to entrain a conveyor belt 3 that is also endless and that has two longitudinal edges 4 that also extend along the path P. Respective roller trucks 5 suspend the edges 4 from a track 6 suspended here from the mine roof by J-shaped hangers 8, although it would be possible to provide appropriate gallows-like support posts or stancheons if appropriate. At a loading zone 9 and an unloading zone 10 the track 6 splits into two transversely spaced branch rails 6' and 7.

The trucks 5 are formed as C-shaped hangers each having a straight upper arm forming a diametral central pivot for a ball roller 12 and an arcuate lower arm with a center of curvature in the center of the respective ball roller 12 and connected to the respective edge 4 at a location lying on a plane including the ball center and perpendicular to the straight arm. The roller ball 12 rides on the upwardly concave and U-shaped track 6, 6', or 7 which is of the same radius of curvature as the balls 12. One of the track branches 6' or 7 can move from an upwardly concave position to a laterally and then downwardly concave one and then back as it passes the unloading zone 10. The other tracks 6, 6, or 7 all remain upwardly concave at all times. The C-shaped hangers 5 are open toward the left, as seen in the travel direction, and the J-shaped suspenders 8 to the right, so they can pass each other.

The belt 3 is moved along the path P by means of the drive element 2 which passes through guides 28 that have downwardly open slots down through which entrainment or pusher tabs 11 fixed on the cable 1 project. The lower arms of the belt hangers 5 are engaged and pushed along by these tabs 11. At the loading zone 9 and unloading zone 10 the guides 28 are provided on the branch track 6'. With such a system the drive element 2 is connected to the belt 3 along its entire length so it is put under minimal tension. Drive stations can be provided at several locations along the path P.

In the transport zone 27 defined between the loading and unloading zones or stations 9 and 10 where the conveyor merely is moving the material from one place to another the trucks 5 are interleaved, that is they alternate, on the main rail 6 as shown in FIG. 1 so that the belt 3 is a virtually closed U-shape or tube.

In the loading zone 9 every other truck 5 is deflected by a mechanism described in more detail below into the one branch 7 while the other trucks 5 continue to travel in the rail 6'. As they move apart they therefore open up and spread out the belt 3 so it can receive material 14— coal, ore, or the like—to be conveyed. As the belt 3 moves out of the zone 9 it is closed up as the two branches 6' and 7 converge and reunite, again interleaving the trucks 5. In this position the belt travels along a transport stretch 27 which may be very long and extend horizontally as well as on an incline.

As the closed-up belt 3 moves into the unloading zone 10 the rail 6 again splits into a pair of branches 6' and 7 which separate slightly horizontally and also vertically. Finally the trucks 5 can move into a position in the zone 10 in which they are vertically superposed or at least offset and the belt 3 is tight between them. In this latter position the bulk material 14 carried by the belt 3 is dumped from it. The rails 6' and 7 then reconverge and the belt 3 returns in the return stretch back to the loading zone 9.

The manner in which the rail 6 splits upstream of the loading and unloading zones 9 and 10 is identical and is shown in detail in FIGS. 1a and 1b. A deflector 16 provided in a Y-intersection or fork 13 has a single input connected to the rail 6 and two outputs connected to the branch rails 6' and 7, which are identical in construction in the loading zone 9 as in the transport zone 27. The upstream Y-intersection 13 is split parallel to the left-hand branch 7 so that the hangers 5 can move along this branch 7 and a similar split is provided at the other end of the loading and unloading zones 9 and 10. This split is so narrow that it does not interfere with a ball 12 rolling into the branch 6'. In the unloading zone 10 the rails 6' and 7 are somewhat differently constructed but not in a manner relevant to the instant invention.

The deflector 16 here is a fork pivoted about an upright axis at the cleft in the Y-intersection 13 between the branches 6' and 7. This Y-shaped element 16 has a central leg 15 that extends upstream relative to the belt travel direction and that can swing from the FIG. 1a position blocking the trucks 5 from rolling from the main rail 6 onto the branch 7 to an opposite position shown in FIG. 1b blocking them from entering the branch 6'. The fork 16 also has downstream of its pivot two arms which can extend across the branches 6' and 7, each such arm extending across whichever branch the upstream leg 15 is deflecting the trucks 5 into.

Thus assuming the system is in the position of FIG. 1a, as a roller 12 moves from the rail 6 into the Y-intersection 13 it will be forced by the leg 15 into the branch 6' where it will engage the downstream arm of the deflector 16 and pivot it into the position of FIG. 1b.

When as shown in FIG. 1b the next roller 12 comes to the fork 13 it will be deflected into the branch 7 and will pivot the deflector 16 back into the FIG. 1a position. In this manner all the trucks 5 of the right-hand edge 3 are deflected into the right-hand branch 9 and all the left-hand trucks 6 of the edge 4 are deflected into the left-hand branch 10, opening up the belt 3. This alternate feeding is perfectly automatic and virtually failure-proof.

According to this invention other carriers 17 for material or people can be suspended from the conveyor for travel along the transport stretch 27 which may be one or more kilometers long. To this end immediately downstream of the loading zone 9 there is a further loading or boarding zone or station 25 and immediately upstream of the unloading zone is another unloading or disembarking zone or station 26.

The carrier 17 of FIG. 2 is a rigid square pallet having upright material-retaining sides 20 meeting at corners 21 to which four cables 18 have their lower ends connected. The upper ends of these cables 18 are provided with hooks 19 that can engage in upwardly open pockets or slots 10 formed on the underside of the belt 3 adjacent its edges 4. The belt 3 normally moves fairly slowly so it is a simple manner to catch the hooks 19 in the pockets 24 to hang the carrier 17 on the belt, and to unhook it at the downstream station 26, although of course it is possible to stop the belt if desired for such loading or unloading.

Figure 3:
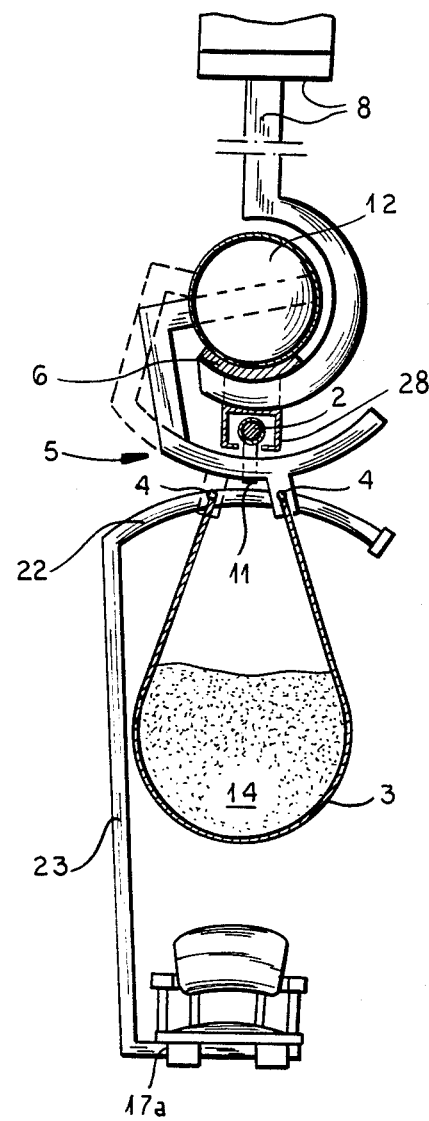
FIGS. 3, 4, and 5 are views like FIG. 2 of variations on the instant invention.

The carrier 17a of FIG. 3 is formed like a ski-lift chair. It is suspended via an upright straight beam 23 from a downwardly arcuate upper arm 22 that is simply poked through the space defined vertically between the bent edges 4 and the guide 23 and horizontally between adjacent trucks 5. Since the belt edges 4 are normally reinforced with a heavy steel cable, the relatively light load of one person in such a chair 17a can easily be carried by them.

Figure 4:
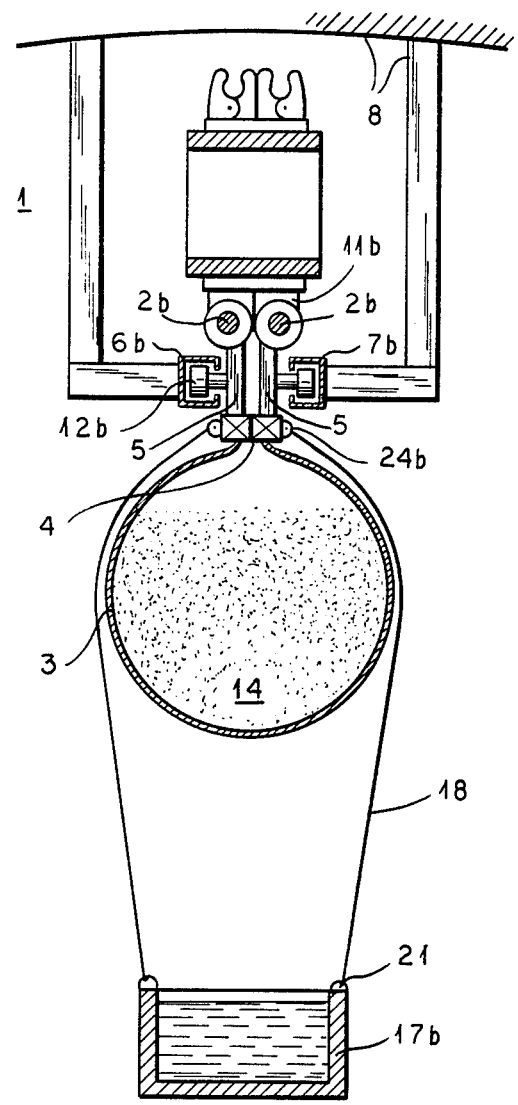

In FIG. 4 two rails 6b and 7b replace the single rail and diverge from each other at the loading and unloading stations 9 and 10. These rails 6b and 7b are of C-section and open toward each other, and the trucks 5 have cylindrical wheel-type rollers 12b confined in the rails 6b and 7b. There are two traction cables 2b carrying releasable grippers 11b making it possible to stop the hangers momentarily easily. In this arrangement the carrier 17b is an upwardly open square vessel suspended at its corners 21 by cables 18 from eyes 24b formed on the trucks 5. The vessel 17b is capable of holding highly fluent and even liquid materials.

Figure 5:
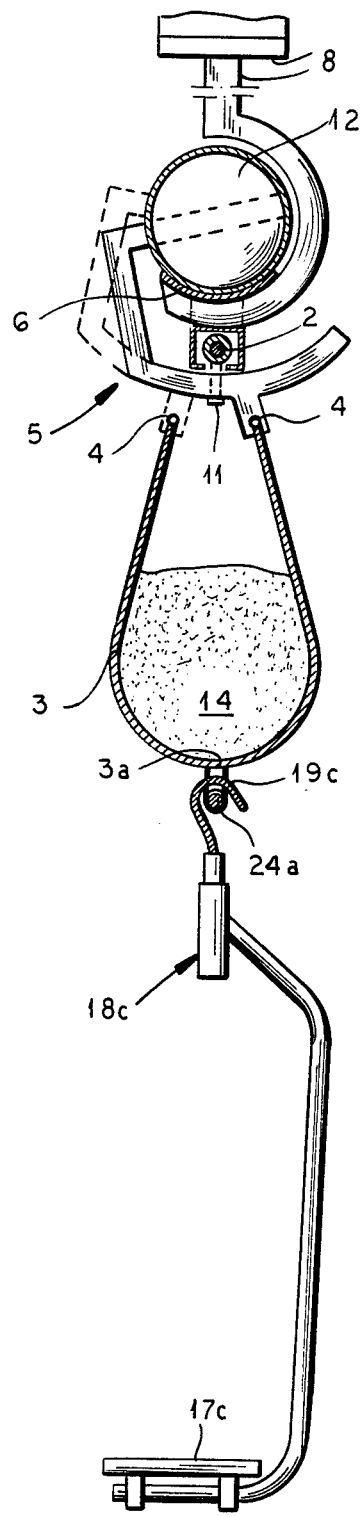

The arrangement of FIG. 5 is identical to that of FIG. 1 except that the belt 3 is provided on its underside midway between its edges with a cable 24a secured at longitudinally spaced locations, forming the cable 24a in effect into a succession of eyes into which can be engaged the hook 19c of a carrier 17c formed as a simple flat platform secured by a rigid J-shaped rod 18c to the hook 19c. This carrier 17c is suitable for someone to stand on, while holding onto the hanger rod 18c, for easy movement in the mine 1 along the transport stretch 27. It is a relatively easy task to hook on the carrier 17c and step onto it, even when the belt 3 is moving.

We claim:

1. A conveyor system comprising:
    a track defining an endless path traversing a loading station and an unloading station and having a transport stretch therebetween;
    conveyor belt means travelling along said track and including an annular succession of longitudinally spaced trucks riding on the track and
    an endless conveyor belt extending along the track and having a pair of longitudinally extending edges one of which is suspended from every other truck and the other of which is suspended from the remaining trucks;
    drive means extending along the track and engageable with the trucks for advancing the belt in a longitudinal transport direction from the loading station through the transport stretch to the unloading station and then back to the loading station;
    at least one carrier;
    at least one respective hanger having a lower end secured to the carrier and an upper end; and
    means for attaching the upper end of the hanger to the conveyor belt means and for thereby suspending the carrier from the conveyor belt means in the transport stretch.

2. The conveyor system defined in claim 1 wherein the attaching means is a hook.

3. The conveyor system defined in claim 1 wherein the carrier is a flat rigid pallet having corners each connected to the lower end of a respective such hanger.

4. The conveyor system defined in claim 1 wherein the carrier is an upwardly open material-carrying vessel having corners each connected to the lower end of a respective such hanger.

5. The conveyor system defined in claim 1 wherein the carrier is an skilift-type chair and the hanger is rigid.

6. The conveyor system defined in claim 5 wherein the attaching means is a hook engageable over the belt edges between adjacent trucks.

7. The conveyor system defined in claim 1 wherein the carrier is an upwardly open person-carrying gondola having corners each connected to the lower end of a respective such hanger.

8. The conveyor system defined in claim 1 wherein the belt is provided along each of its edges with a row of pockets open toward the edges, the attaching means being hooks engageable in the pockets.

9. The conveyor system defined in claim 1 wherein the hanger includes a stiff rod portion pivoted at the lower end on the carrier.

10. The conveyor system defined in claim 1 wherein the hanger is flexible and substantially inelastic.

11. The conveyor system defined in claim 1 wherein the belt is provided between its edges with a flexible and inextensible elements forming a succession of laterally open apertures, the attaching means being a hook engageable through the apertures.

12. The conveyor system defined in claim 1, further comprising
    a boarding station adjacent the loading station and adapted for attaching the carriers to the belt.

13. The conveyor system defined in claim 1, further comprising
    a disembarking station adjacent the unloading station and adapted for detaching the carriers from the belt.

14. The conveyor system defined in claim 1, further comprising:
    closing means at the loading station for moving the edges from a spaced-apart position with the belt lying open therebetween to a juxtaposed position with the belt tubular, whereby the belt is tubular as it enters the transport stretch; and opening means at the unloading station for moving the edges from the juxtaposed position to the spaced-apart position, whereby the belt is flattened out at the output stretch so that bulk material loaded onto the flattened out belt at the loading station is transported by the belt through the transport stretch and discharged from the belt at the unloading station.

15. The conveyor system defined in claim 14 wherein the track branches into two branch tracks at the loading and unloading stations.

16. The conveyor system defined in claim 15, further comprising:
deflector means upstream of the loading zone on the track for deflecting alternating trucks into the loading-zone branch tracks.

* * * * *